Patented May 9, 1950

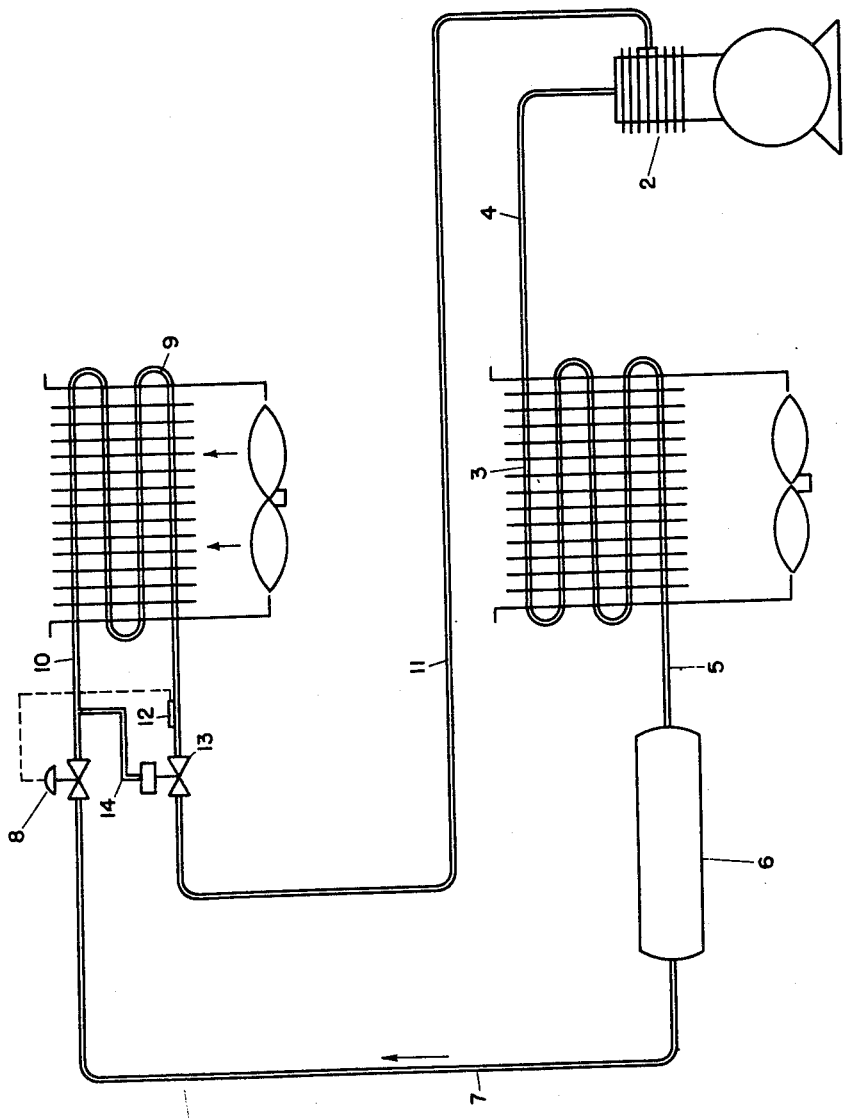

2,506,757

UNITED STATES PATENT OFFICE 2,506,757

REFRIGERATION SYSTEM

Maurice J. Wilson, Atlanta, Ga., assignor to Carrier Corporation, Syracuse, N. Y., a corporation of Delaware Application July 16, 1946, Serial No. 683,911

3 Claims. (Cl. 62—8)

This invention relates to refrigeration systems and more particularly to a refrigeration system including regulating means for varying the temperature of the evaporator in response to a change in load imposed upon the system to maintain the temperature of leaving air substantially constant. The term "leaving air" is used herein to designate air which has passed through the coil of the evaporator in heat exchange relation therewith.

In refrigeration systems, occasionally a back pressure regulator is installed in the suction line to maintain a desired pressure in the evaporator. Under such circumstances, the compressor is designed to operate at a suction pressure several pounds below the design evaporator pressure to make allowance for pressure drop through the back pressure regulator. The back pressure regulator so installed is responsive to pressure, either in the evaporator or at the leaving side of the evaporator. When such a device is used, I have found that a considerable variation in the temperature of leaving air is permitted, the variation being proportionate to the load imposed upon the system. In air conditioning installations, for example, for satisfactory operation the temperature of leaving air should be maintained substantially constant. Back pressure regulators of the type customarily used in the industry do not perform this function since they serve primarily to maintain the evaporator at a desired pressure. With an increase in load imposed upon the system, the regulating device may serve to maintain a desired evaporator temperature, but the temperature of the leaving air may increase as much as 10°. Likewise, with a decrease in load imposed upon the system the regulating device may serve to maintain desired evaporator temperature and pressure conditions but the temperature of the leaving air may decrease to an undesirable degree.

The chief object of the present invention is to provide a refrigeration system including means for maintaining the temperature of leaving air substantially constant.

An object of the invention is to provide a refrigeration system including means for decreasing the average evaporator temperature in accordance with an increase in load thus maintaining the temperature of the leaving air relatively constant.

A further object is to provide a refrigeration system in which the spread between the coil surface temperature and the leaving air temperature increases with increased loading of the evaporator and decreases proportionately with a decrease in loading of the evaporator while maintaining the temperature of the leaving air relatively constant.

A still further object is to provide a method of operating a refrigeration system in which the average evaporator temperature is decreased in accordance with an increase in load thereby maintaining the temperature of leaving air substantially constant.

A still further object is to provide a method of operating a refrigeration system in which the average evaporator temperature is decreased from a predetermined standard in accordance with an increase in load imposed upon the system.

This invention relates to a refrigeration system including in combination an evaporator, a compressor, a condenser and refrigerant circulating lines connecting such members, means for regulating the flow of liquid refrigerant from the condenser through the evaporator in response to variations in heat load imposed upon the evaporator, and control means disposed in the suction line responsive to inlet evaporator pressure for varying the evaporator temperature in accordance with the load imposed upon the system thereby maintaining the temperature of leaving air substantially constant.

This invention further relates to a method of regulating the action of the evaporator of a refrigeration system of the compression type in which the steps comprise supplying refrigerant to an evaporator for evaporation therein, withdrawing evaporated refrigerant from the evaporator, and regulating the temperature of the evaporator in accordance with the load imposed upon the system to maintain the temperature of leaving air substantially constant.

The attached drawing is a diagrammatic view of a refrigeration system embodying the present invention.

Referring to the attached drawing, there is shown a compressor 2 connected to a condenser 3 by means of line 4; a line 5 connects condenser 3 with a receiver 6. Liquid line 7 connects the receiver with an expansion valve 8. Expansion valve 8 is connected to evaporator 9 by means of line 10. Evaporator 9 is connected to compressor 2 by suction line 11. The expansion valve 8 is controlled in the usual manner by means of a thermal bulb 12 disposed adjacent the suction line 11 at the leaving end of evaporator 9. Expansion and contraction of fluid in bulb 12 in accordance with the super heat of refrigerant leaving of evaporator 9 moves expansion valve 8 alternately toward open and closed positions to meter the amount of refrigerant supplied to evaporator 9. A control valve 13 is disposed in suction line 11, preferably, between bulb 12 and compressor 2. A line 14 connects control valve 13 with the liquid line; preferably, the juncture of line 14 with the liquid line is at a point between expansion valve 8 and the evaporator 9. Control valve 13 is responsive to inlet evaporator pressure which tends to move it toward open and closed positions in accordance with variations from a predetermined standard.

Air is passed through evaporator 9 in heat exchange relation therewith as indicated by the arrow in the drawing. In air conditioning applications, for example, it is desired to maintain the temperature of the leaving air substantially constant.

Assume an increase in evaporator pressure above a predetermined point in response to an increase in load imposed upon the system. The increased evaporator pressure actuates control valve 13 to move toward an open position thereby permitting an increased amount of refrigerant to flow through suction line 11 thus decreasing the temperature of the evaporator. Since the decrease in temperature of the evaporator is proportionate to the increase in load imposed upon the system, the temperature of the leaving air is maintained substantially constant.

Assume, for example, a decrease in load imposed upon the system. In such case, the decrease in evaporator pressure permits control valve 13 to move toward a closed position, decreasing the flow of refrigerant through suction line 11. Since the amount of refrigerant permitted to pass through suction line 11 is decreased, the temperature of the evaporator is increased proportionately thus maintaining the temperature of the leaving air substantially constant.

If desired, the present invention may be employed in a system in which a float valve is used in place of the expansion valve 8 shown in the figure. In such case, liquid refrigerant may be supplied through liquid line 7 to the float valve disposed in a surge drum and then to the evaporator. Gaseous refrigerant is returned to the surge drum from the evaporator and is withdrawn from the surge drum through the suction line. Control valve 13 is connected as previously described and is responsive to inlet evaporator pressure.

This invention provides a refrigeration system of particular value in connection with air conditioning applications. The present invention serves to maintain leaving air conditions at approximately the same level throughout the entire load range since it compensates for an increase in load by decreasing the temperature of the evaporator and for a decrease in load by a proportionate increase in average evaporator temperature. An advantage of the present invention resides in the fact that less evaporator surface is generally required than is requisite when a back pressure regulator is used in the ordinary manner. Evaporating temperatures are maintained under light loads thus eliminating frosting while, at maximum load, a reduction in evaporator temperature utilizes the existing surface more effectively. The present invention is readily and quickly installed in existing or new equipment with slight additional expenditure and serves effectively to maintain leaving air conditions at approximately the same level throughout the entire load range.

While I have described and illustrated a preferred embodiment of my invention, It will be understood my invention is not limited thereto since it may be otherwise embodied within the scope of the following claims.

I claim:

1. In a refrigeration system, the combination of an evaporator, a compressor, a condenser and refrigerant circulating lines connecting said members, means for regulating the flow of liquid refrigerant from the condenser through the evaporator in response to variations in heat load upon the evaporator, and control means in the suction line responsive to inlet evaporator pressure for metering refrigerant flow through the suction line, said control means serving to vary the temperature of the evaporator in accordance with the load imposed upon the system thereby maintaining the temperature of leaving air substantially constant.

2. In a refrigeration system, the combination of an evaporator, a compressor, a condenser and refrigerant circulating lines connecting said members, means for regulating the flow of liquid refrigerant from the condenser through the evaporator in response to variations in heat load imposed upon the evaporator, and a control valve disposed in the suction line for metering refrigerant flow through the suction line, and means connecting the control valve with the liquid line thereby rendering the valve responsive to inlet evaporator pressure, said control valve in response to an increase in evaporator pressure above a predetermined level tending to move toward an open position permitting an increased flow of vapor through the suction line to the compressor and in response to a decrease in evaporator pressure below a predetermined level tending to move toward a closed position to decrease the flow of vapor through the suction line to the compressor thus varying the temperature of the evaporator in accordance with the load imposed upon the system to maintain the temperature of leaving air substantially constant.

3. In a refrigeration system, the combination of an evaporator, a compressor, a suction line connecting the evaporator and the compressor, a condenser connected to the compressor, an expansion valve connected to the evaporator, a liquid line connecting the expansion valve and the condenser, thermal means disposed adjacent the suction line for controlling the operation of the expansion valve, a regulating valve disposed in the suction line, a line connecting the regulating valve with the line connecting the expansion valve and the evaporator to render the regulating valve responsive to pressure therein, said regulating valve in response to an increase in pressure above a predetermined level in said line tending to move toward an open position permitting an increased flow of vapor through the suction line to the compressor and in response to a decrease in pressure below a predetermined level in said line tending to move toward a closed position to decrease vapor flow through the suction line to the compressor to vary the temperature of the evaporator in accordance with the load imposed upon the system thereby maintaining the temperature of leaving air substantially constant.

MAURICE J. WILSON.

REFERENCES CITED

The following references are of record in the file of this patent:

UNITED STATES PATENTS

| Number | Name | Date |
|---|---|---|
| 2,106,591 | Briggeman | Jan. 25, 1938 |
| 2,242,334 | Wile | May 20, 1941 |
| 2,262,234 | Hoesel | Nov. 11, 1941 |
| 2,363,273 | Waterfill | Nov. 21, 1944 |
| 2,443,500 | Goddard | June 15, 1948 |

OTHER REFERENCES

Principles of Refrigeration, (3rd ed. Rev.), Mott, Chicago, 1947, page 363.